US011205798B2

(12) United States Patent
Li et al.

(10) Patent No.: US 11,205,798 B2
(45) Date of Patent: Dec. 21, 2021

(54) CAPACITOR-ASSISTED SOLID-STATE BATTERY

(71) Applicant: GM GLOBAL TECHNOLOGY OPERATIONS LLC, Detroit, MI (US)

(72) Inventors: Zhe Li, Pudong (CN); Dave G. Rich, Sterling Heights, MI (US); Haijing Liu, Shanghai (CN); Dewen Kong, Minhang (CN); Sherman H. Zeng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 16/048,427

(22) Filed: Jul. 30, 2018

(65) Prior Publication Data

US 2020/0036070 A1  Jan. 30, 2020

(51) Int. Cl.
| | |
|---|---|
| *H01M 10/0525* | (2010.01) |
| *H01M 10/0585* | (2010.01) |
| *H01M 10/056* | (2010.01) |
| *H01M 10/0562* | (2010.01) |
| *H01G 11/06* | (2013.01) |
| *H01G 11/56* | (2013.01) |
| *H01G 11/28* | (2013.01) |

(52) U.S. Cl.
CPC ........ *H01M 10/0525* (2013.01); *H01G 11/06* (2013.01); *H01G 11/28* (2013.01); *H01G 11/56* (2013.01); *H01M 10/056* (2013.01); *H01M 10/0562* (2013.01); *H01M 10/0585* (2013.01); *H01M 2300/0068* (2013.01); *H01M 2300/0082* (2013.01); *H01M 2300/0091* (2013.01)

(58) Field of Classification Search
CPC .......... H01M 12/005; H01M 10/0525; H01M 10/056; H01M 10/0562; H01M 10/0585
See application file for complete search history.

(56) References Cited

U.S. PATENT DOCUMENTS

| | | | |
|---|---|---|---|
| 2011/0070504 A1 | 3/2011 | Matsumoto et al. | |
| 2013/0026409 A1* | 1/2013 | Baker | H01M 10/0567 252/62.2 |
| 2013/0162216 A1* | 6/2013 | Zhamu | H01M 4/133 320/130 |
| 2016/0268627 A1* | 9/2016 | Lee | H01M 4/485 |
| 2018/0241079 A1* | 8/2018 | Duong | H01M 4/382 |

* cited by examiner

*Primary Examiner* — Jimmy Vo
(74) *Attorney, Agent, or Firm* — Quinn IP Law

(57) ABSTRACT

A capacitor-assisted, solid-state lithium-ion battery is formed by replacing at least one of the electrodes of the battery with a capacitor electrode of suitable particulate composition for the replaced battery particulate anode or cathode material. The solid-state electrodes typically contain solid-state electrode material and are separated with solid-state electrode material. In another embodiment the capacitor anode or cathode particles may be mixed with lithium-ion battery anode or cathode particles respectively. Preferably, the battery comprises at least two positively-charged electrodes and two negatively-charged electrodes, and the location and compositions of the capacitor material electrode(s) may be selected to provide a desired combination of energy and power.

25 Claims, 5 Drawing Sheets

CAPACITOR-ASSISTED SOLID-STATE BATTERY

INTRODUCTION

Lithium-ion batteries can be formed to provide effective energy for powering electric motor-driven automotive vehicles and for powering many other consumer products. Some lithium-ion batteries use a liquid electrolyte and others can be prepared with solid electrolytes. For commercial applications, it is necessary or desirable to increase the power densities or power response of such batteries using solid electrolytes. In this disclosure, the power densities or power responses of solid-state batteries are increased by the use of capacitor electrodes containing capacitor particles in combinations with battery electrodes in a solid-state capacitor-assisted, lithium-ion battery cell. Further, such benefits are obtained with electrodes containing both capacitor particles and particles of active battery anode or cathode materials.

SUMMARY

Solid state lithium-ion batteries have the potential to provide significant improvements in commercial rechargeable battery markets in view of their stability, achievable energy density, and low self-discharge rate. However, the power densities and current-rate delivery capability of such batteries are generally lower than like lithium-ion batteries with liquid electrolytes, especially at low ambient temperatures (e.g., −30° C.), and even at ambient temperatures of 25° C. This is perceived, herein, to be due to the inherently high ionic resistance of solid electrolytes and the unfavorable electrochemical interfaces between solid electrolyte materials and active electrode materials in such solid-state lithium-ion batteries.

As a non-limiting illustrative example, an individual cell of a solid-state lithium-ion battery may be mainly formed of particles of lithium titanate anode material ($Li_4Ti_5O_{12}$), solid electrolyte particles formed of a mixture of 75 molar percent $Li_2S$ and 25 molar percent $P_2S_5$, and particles of $LiNbO_3$-coated $LiCoO_2$ cathode material. Particles of active electrode materials may be mixed with suitable proportions of electrolyte particles and/or with some proportions of electrically conductive carbon particles. Electrode materials are typically formed in layers to one or both sides of a suitably shaped and sized current collector (often a thin aluminum or copper foil). Other suitable electrode and electrolyte materials are disclosed below in this specification.

In capacitor-assisted solid-state battery assemblies, a basic grouping or module of three adjacent and electrically-connected, anode-cathode cells may be used. In addition to battery electrodes, the assemblies include a capacitor anode, a capacitor cathode, or both. Each of the capacitor electrodes may, for example, be formed of particles of activated carbon. Additional capacitor electrode materials are presented below in this specification. Larger cell groups may be prepared for specific applications. But in the following illustrative disclosures, the basic lithium-ion battery/capacitor hybrid modules comprise three cells. The assemblies may be bulk-type in the form of sheets or pellets of layers of the respective electrode, electrolyte, and current collector members. Or the assembly may be formed as a thin-film layered package.

In the following illustrative descriptions of these exemplary basic three cell capacitor/battery assemblies, one should visualize (as illustrated in the attached drawing figures) a side-view of an assembly of vertically-oriented, adjacently stacked, solid electrode and solid electrolyte members comprising four like-shaped, parallel-aligned, current collector foils carrying six layers of electrode materials with three inter-positioned layers of solid electrolyte layers. A current collector at each end of the assembly carries an inward-facing layer of lithium-ion battery electrode material or capacitor electrode material. The next inward layer from each end electrode is a layer of solid electrolyte material. These two layers of solid electrolyte particles face an inner current collector coated on each side with a layer of particulate electrode material. The inner-most electrode layers are separated by a third layer of solid electrolyte. The outside current collectors are electrically connected with the further-spaced inner current collector. The first and third current collectors are connected, as are the second and fourth current collectors.

In a first embodiment of a capacitor-assisted, solid-state lithium-ion battery (illustrated in FIG. 1), a two-sided, capacitor material layer, capacitor electrode (one of either a capacitor anode or capacitor cathode) is incorporated into a three-cell module of four lithium-ion battery electrode material layers. A three-cell assembly is formed which includes either an anode electrode or a cathode electrode of lithium-ion capacitor material (e.g. activated carbon particles, preferably mixed with particles of a solid electrolyte) that replaces the corresponding lithium-ion battery anode or cathode. The three-cell assembly then comprises two layers of capacitor anode or cathode material on opposite sides of a current collector in an assembly with three electrode layers of battery cathode (or anode) material and one layer of battery anode (or cathode) material. A negative electrode (during cell discharge) of capacitor anode material is electrically connected with a battery anode, or a positive electrode (during cell discharge) of capacitor cathode material is electrically connected with a battery cathode.

In a second embodiment of a capacitor-assisted, solid-state lithium-ion battery, an electric double-layer capacitor (EDLC) is incorporated into a solid-state lithium-ion battery (FIG. 2). The three-cell assembly comprises a positively-charged capacitor cathode electrically connected with a battery cathode, and a negatively-charged capacitor anode electrically connected with a battery anode.

In a third embodiment of a capacitor-assisted, solid-state lithium-ion battery (FIG. 3), one of the inner electrodes is an asymmetric anode electrode or an asymmetric cathode electrode, formed with lithium-ion battery electrode material on one of its sides and a like-charged capacitor electrode material on its opposite side.

In a fourth embodiment of a capacitor-assisted, solid-state lithium-ion battery (FIG. 4), the solid electrolyte layers facing a layer of capacitor electrode material are formed of a solid electrolyte composition adapted for the capacitor electrode material composition. A different, suitable solid electrolyte composition for the battery electrode materials is used between two facing battery electrode layers.

And in a fifth embodiment of a capacitor-assisted, solid-state lithium-ion battery (FIG. 5), the capacitor-containing electrodes may be formulated of a mixture of particles of each of capacitor electrode material, a compatible battery anode or cathode material, and solid-state electrolyte material.

Further disclosure of these capacitor-assisted solid-state lithium-ion battery embodiments is presented in the following sections of this specification and in the drawing figures.

Viewed, starting from the left side of the figure, is a first lithium-ion capacitor cell, formed of a current collector with a bonded layer of particulate lithium-ion battery cathode material (dark particles with light dots) mixed with particles of solid electrolyte material (white particles with black dots), a layer of particulate solid electrolyte material (white particles with black dots), and a particulate anode layer of activated carbon capacitor material (particles with dense black dots) mixed with particle of solid electrolyte material (light particles with black dots), bonded to the left side of a second current collector foil. Bonded to the opposite side of the second current collector foil is a particulate anode layer of activated carbon capacitor material particles (particles with dense black dots) mixed with solid electrolyte material (white particles with black dots). This particulate anodic capacitor layer is part of a second lithium-ion capacitor cell. Placed against the capacitor anode material layer is a particulate layer of solid electrolyte material (white particles with black dots) followed by a bonded layer of particulate lithium-ion battery cathode material (black particles with white dots) mixed with particles of solid electrolyte material (white particles with black dots). This layer of cathode material is bonded to one side of a third current collector foil. Bonded to the opposite side of the third current collector foil is a like-layer of particulate lithium-ion cathode material, mixed with solid electrolyte particles, which is part of a third cell—a lithium-ion battery cell. This cell is completed with a layer of particulate solid electrolyte material (white particles with black dots) and a layer of lithium-ion battery anode material (white particles with organized rows of black dots) bonded to one side of a fourth current collector.

The respective current collectors have tabs extending from their top sides. Starting from the left side of FIG. 1, the first and third current collectors are electrically connected and indicated as positively charged as they would be during discharge of the capacitor-assisted solid-state battery cell module. The second and fourth current collectors are electrically connected and indicated as negatively charged.

Figure 1:
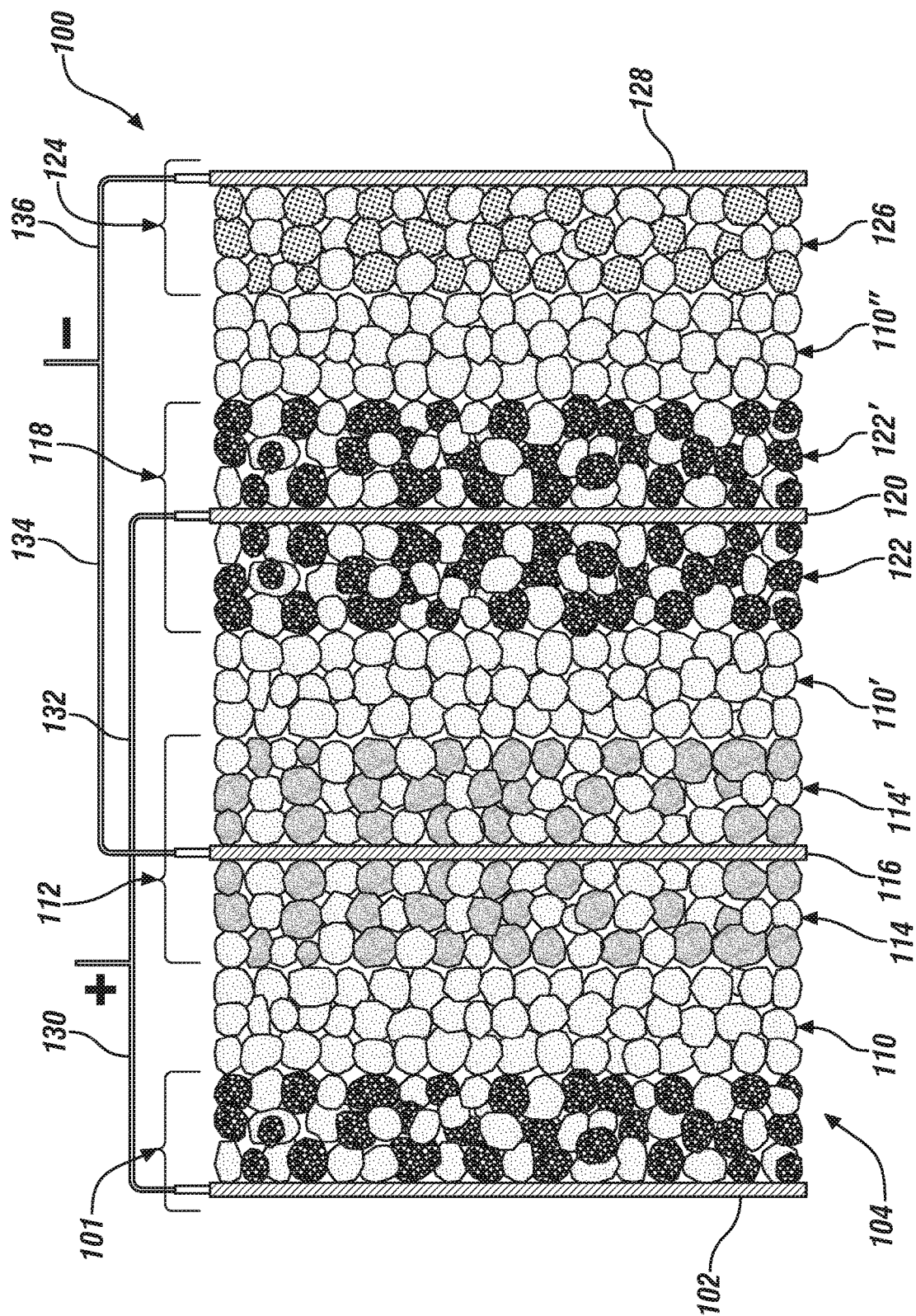
FIG. 1 is a schematic cross-sectional view of the side edges of a three-cell, capacitor-assisted, solid-state, lithium-ion battery incorporating two anode layers of capacitor material, one anode layer of lithium-ion battery material, and three cathode layers of lithium-ion battery material. The respective anode, cathode, and solid electrolyte layers have like rectangular shapes which are not visible in the cross-sectional illustration presented in FIG. 1.
Figure 2:
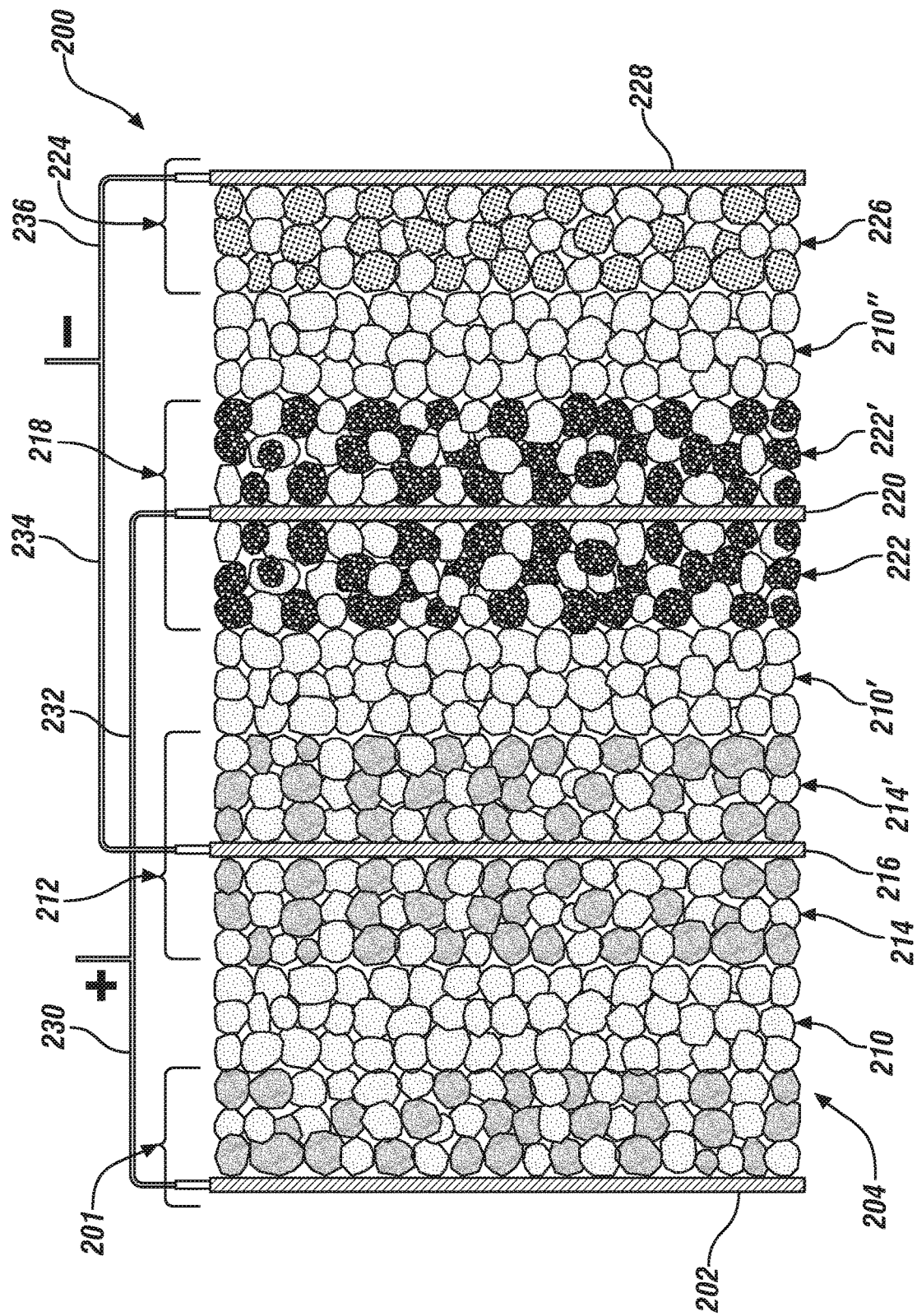

FIG. 2 is a schematic cross-sectional view of the side edges of a three cell, capacitor-assisted, solid state battery incorporating an electric double layer capacitor (EDLC). The respective anode, cathode, and solid electrolyte layers have like rectangular shapes which are not visible in the illustration presented in the side-view illustration of FIG. 2. And the lithium-ion anode and cathode particles, the capacitor electrode particles and the solid electrolyte particles are illustrated as in FIG. 1.

Viewed, starting from the left side of the figure, is an EDLC cell with a positively-charged cathode of capacitor cathode particles mixed with solid electrolyte particles, a layer of solid electrolyte particles and a negatively-charged electrode of capacitor anode particles mixed with solid electrolyte particles. The second cell comprises a lithium-ion capacitor anode opposing a lithium battery cathode. And the third cell is a lithium-ion battery cell (cathode opposing an anode) composed as the third cell in FIG. 1.

Figure 3:
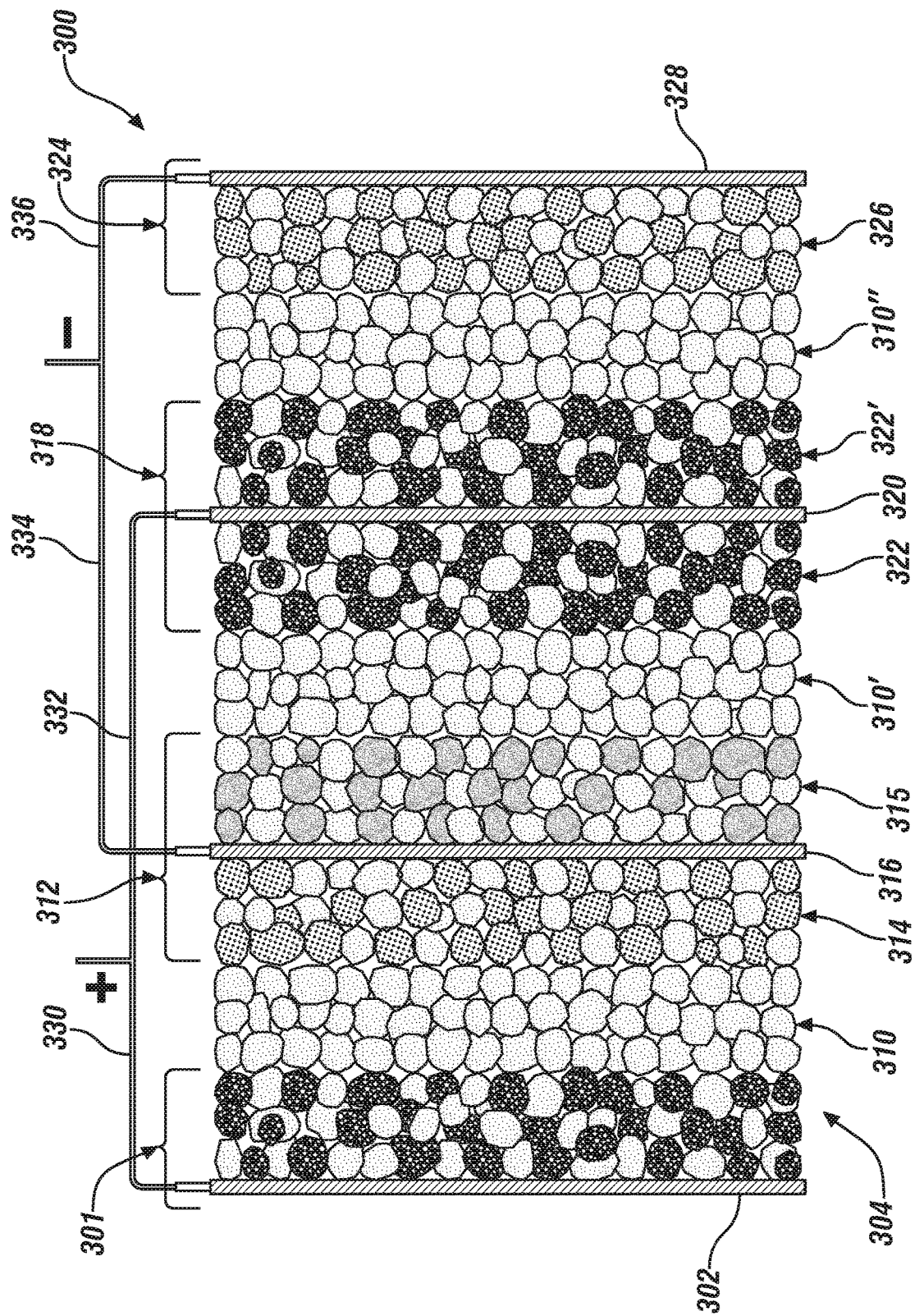

FIG. 3 is a schematic cross-sectional view of the side edges of a three cell, capacitor-assisted, solid state battery incorporating an asymmetric electrode. The respective anode, cathode, and solid electrolyte layers have like rectangular shapes which are not visible in the illustration presented in FIG. 3. The lithium-ion anode and cathode particles, the capacitor electrode particles and the solid electrolyte particles are as illustrated as in FIG. 1.

In FIG. 3, the second current-collector (negatively-charged), as viewed starting from the left side of the figure, carries a layer of particles of lithium-ion anode material, mixed with solid electrolyte particles, bonded to its left side and a layer of particles of capacitor active material particles mixed with solid electrolyte particles and bonded to its right side.

Figure 4:
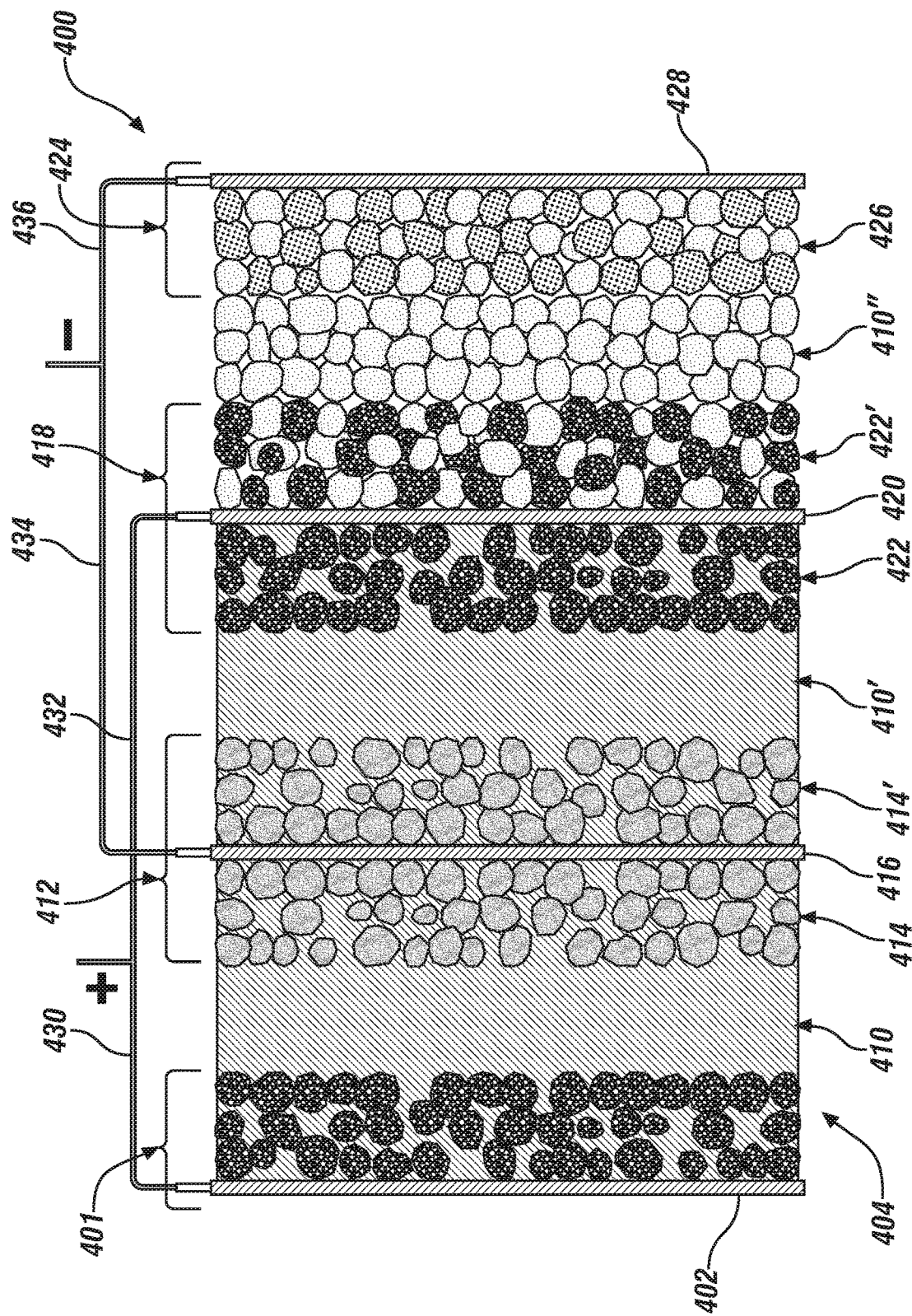

FIG. 4 is a schematic cross-sectional view of the side edges of a three cell, capacitor-assisted, solid-state battery incorporating two different solid-state electrolytes. The respective anode, cathode, and solid electrolyte layers have like rectangular shapes which are not visible in the illustration presented in FIG. 4.

In FIG. 4, the solid electrolyte material used in the first two cells (as viewed starting from the left side of FIG. 4) comprising an electrode of capacitor material is a special capacitor electrolyte composition (schematically illustrated as parallel, ascending lines) which is different from the solid electrolyte layer (white particles with black dots) used in the third cell, a lithium-ion battery cell.

Figure 5:
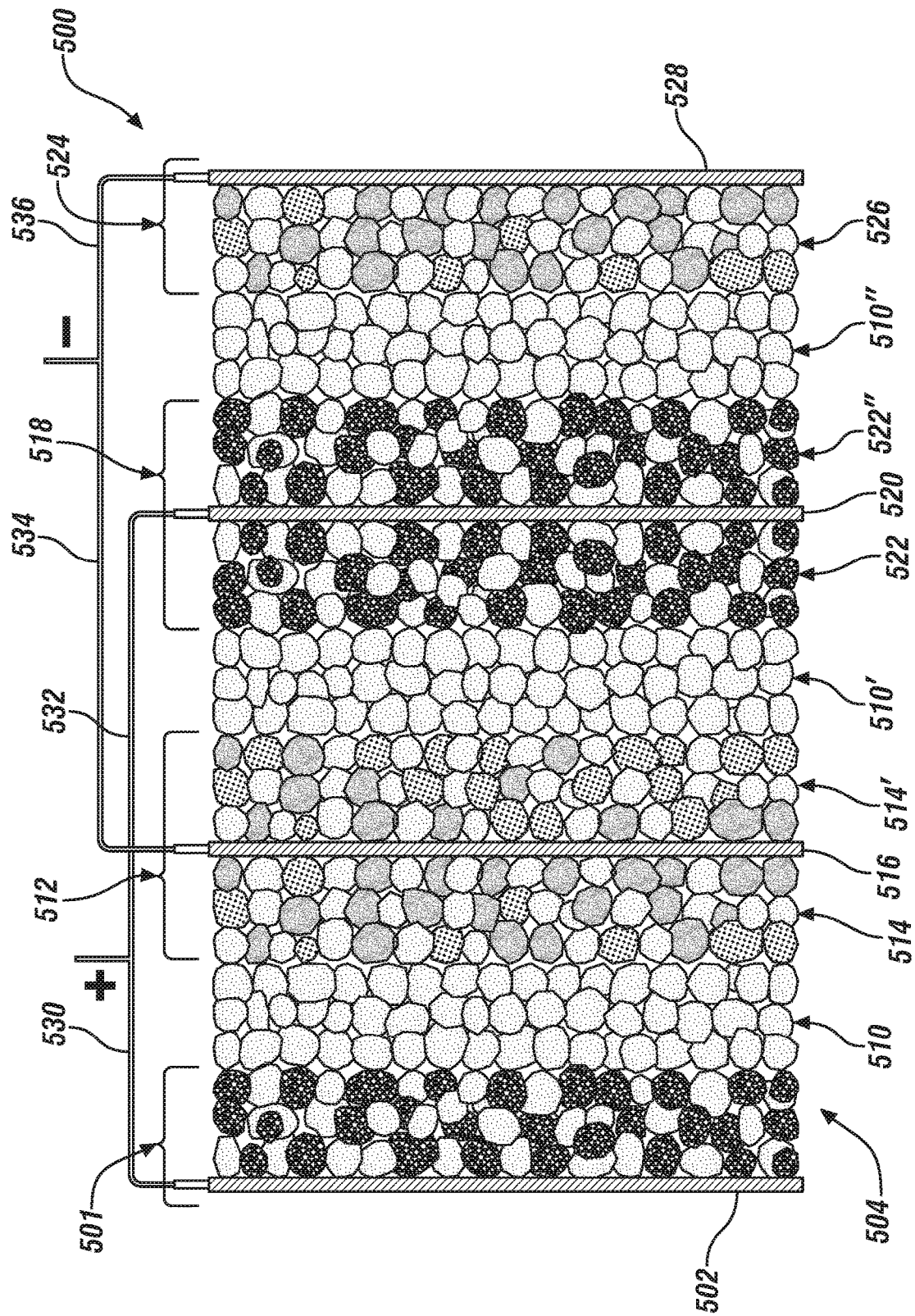

FIG. 5 is a schematic cross-sectional view of the side edges of a three cell, capacitor-assisted, solid-state battery incorporating particles of capacitor material mixed with particles of anode material in layers of electrode material. The respective anode, cathode, and solid electrolyte layers have like rectangular shapes which are not visible in the illustration presented in FIG. 5.

In FIG. 5, both electrode material layers of the second electrode as viewed from the left side of the figure, a negative electrode, are mainly formed of a mixture of lithium-ion active anode material particles, capacitor particles, and particles of a solid electrolyte. The respective particles of battery electrode materials, capacitor electrode materials, and solid electrolyte particles are illustrated as in FIG. 1-3.

DETAILED DESCRIPTION

In accordance with this disclosure, capacitor-assisted, solid state, lithium-ion batteries are provided comprising various combinations of battery anodes, battery cathodes, capacitor anodes, capacitor cathodes, and solid electrolytes.

The lithium-ion battery anodes and capacitor anodes are typically formed of closely-packed, layers of anode active material particles mixed with solid electrolyte particles. Depending on the composition of the solid electrolyte, the anode mixtures may contain a conductive additive such as conducive-carbon particles (e.g., acetylene black) and a polymeric binder (e.g., styrene butadiene styrene copolymer) that could enable a good mechanical property and good adhesion between current collectors and particles. The anode layers may display some porosity. The anode layer typically has a two-dimensional rectangular shape and size with a uniform thickness. One side of the anode layer is suitably attached or bonded (or the like) to one side of a current collector foil (typically a copper current collector foil that is shaped to cover the surface of the attached anode layer and with a tab extending outwardly for electrical connection with other electrodes in a group of electrodes and cells). The other side of the anode layer faces an overlying, like-shaped, layer of electrolyte particles. Facing the other side of the layer of electrolyte particles is a coextensive layer of a like-shaped battery or capacitor cathode.

The cathode is typically formed of a layer of battery or capacitor cathode active material particles mixed with some solid electrolyte particles. Depending on the composition of the solid electrolyte, the cathode mixtures may contain a conductive additive such as conducive-carbon particles (e.g., acetylene black, sometimes AB in the following text) and a polymeric binder (e.g., styrene butadiene styrene copolymer) that could enable a good mechanical property and good adhesion between current collectors and particles. The cathode layers may display some porosity. The other side of the cathode layer is bonded to one side of a current collector foil (typically an aluminum current collector foil that is shaped to cover the surface of the facing cathode layer and with a tab (sometimes covered) for electrical connection with other electrodes in a group of cells). Thus, the electrolyte layer has a two-dimensional shape that suitably electrochemically and coextensively contacts the anode layer on one of its sides and the cathode layer on its other side.

The anode and cathode of the battery cell are composed, sized and shaped to provide a predetermined capacity for the cell. The battery electrodes contribute to the overall energy and power density of the cell while the capacitor electrodes are composed to provide a quick power response when it is required.

Examples of lithium-ion battery cathode active materials comprise $LiFePO_4$, $LiMn_2O_4$, $LiCoO_2$, $LiNi_{0.5}Mn_{1.5}O_4$, lithium nickel cobalt manganese oxide (NCM), lithium nickel cobalt aluminum oxide (NCA) and other lithium transition-metal oxide. A further example of a lithium-ion battery cathode material is $LiNbO_3$-coated $LiCo_2$. In the following examples a solid-state lithium-ion battery cathode may comprise a suitable active cathode material, a solid electrolyte, a conductive additive (e.g. conductive carbon particles), and a binder (if needed). Preferably, the proportion of active cathode material is greater than about 30 wt % of the total cathode material mixture, the proportion of solid electrolyte (SE) is preferably lower than about 60 wt % of the total cathode material, and the ratio of conductive additive should be lower than about 10 wt % of the total cathode material.

Examples of suitable lithium-ion battery anode active materials comprise: carbonaceous material (e.g. graphite, hard carbon, soft carbon etc.), silicon, silicon-carbon blended material (silicon-graphite composite), $Li_4Ti_5O_{12}$, transition-metal (alloy types, e.g., Sn), metal oxide/sulfide (e.g., $SnO_2$, FeS and the like). Also, suitable lithium-ion battery anode active materials include Li metal and Li-metal alloys (e.g., Li—In).

In the following examples a solid-state lithium-ion battery anode may comprise a suitable active anode material, a solid electrolyte, a conductive additive (e.g. conductive carbon particles), and a binder (if needed). Preferably, the proportion of active anode material is greater than about 30 wt % of the total anode material mixture, the proportion of solid electrolyte (SE) is lower than about 60 wt % of the total anode material, and the ratio of conductive additive should be lower than about 10 wt % of the total anode material.

Examples of suitable capacitor cathode active material comprise activated carbon, graphene, carbon nanotubes, other porous carbon materials, a conducting polymer (e.g. polyethylenedioxythiophene). A solid-state capacitor electrode may be formed of a mixture of active capacitor material (e.g. activated carbon), solid electrolyte (if needed), conductive additive (e.g. acetylene black), and binder (if needed).

Examples of a suitable capacitor anode active material comprise activated carbon, soft carbon, hard carbon, and metal oxide/sulfide (e.g., $TiO_2$). A solid-state capacitor electrode may be formed of a mixture of active capacitor material (e.g. activated carbon), solid electrolyte (if needed), conductive additive (e.g. AB), and binder (if needed).

As stated above in this specification, as a non-limiting example, solid electrolyte particles are formed of a suitable mixture of 75 mole percent $Li_2S$ and 25 mole percent $P_2S_5$. An extended list of solid electrolyte materials is provided below in this specification.

FIG. 1 is a schematic cross-sectional view of the side edges of a first embodiment of a three-cell, capacitor-assisted, solid-state battery 100. The respective electrode members and solid electrolyte members have like rectangular shapes which are not visible in the illustration presented in FIG. 1. An example of the dimensions of a representative rectangular cross section are 50 mm by 55 mm. In general, the thickness of the electrode layers may be from dozens to hundreds of micrometers and the thickness of the electrolyte layers is usually in the range from several micrometers to hundreds of micrometers. The sizes of the generally spherical electrode and electrolyte particles are typically about 20 nm to 50 um. As will be described in the following paragraphs, the two-dimensional shapes and dimensions of the electrode members are determined to enable them to fit substantially face-to face in an assembled cell of required function and capacity. And the respective thicknesses of the electrode bodies and electrolyte bodies are based on their required functions and capacities or energy densities in the assembled cells.

Starting from the left side of FIG. 1 is shown a cathode electrode 101 formed of a particulate layer of lithium-ion battery cathode material 104 of substantially uniform thickness (e.g. in the range of about 10 to 1000 micrometers), bonded substantially co-extensively to a major face of a rectangular current collector foil 102, suitably an aluminum foil having a uniform thickness in the range of about five to twenty-five micrometers. While most of the surface of current collector foil is covered with the battery cathode material 104, a tab (coated or un-coated) or like connection-portion at one side (the top edge in FIG. 1 and the following figures) of the current collector is provided to facilitate electrical connection through electrical connection 130 with another cathode electrode 118.

In this embodiment, the lithium-ion battery cathode material 104 is mainly formed of a mixture of particles of active cathode material (dark particles with white dots) and particles of solid electrolyte material (white particles with black dots). As stated, an example of a suitable particulate cathode material is lithium niobium oxide ($LiNbO_3$)-coated lithium cobalt oxide ($LiCoO_2$). And an example of a solid electrolyte material is particles formed of a mixture of 75 mole percent $Li_2S$ and 25 mole percent $P_2S_5$.

Placed coextensively against the flat surface of cathode material layer 104 of cathode electrode 101 is the co-extensive and compatible flat surface of a particulate, solid electrolyte 110 in which particles (white particles with black dots) of a suitable electrolyte composition are suitably consolidated in a solid electrolyte body. This solid electrolyte layer 110, sometimes, may be formed of a mixture of solid electrolyte and a suitably small amount of polymeric binder (e.g., styrene butadiene copolymer), where the addition of the binder is to obtain suitable mechanical properties. Particles of the same solid electrolyte material may be used in each layer of electrode material and each electrolyte layer in the cells of this embodiment of the disclosure.

Lying face-to-face against solid-electrolyte body 110 is a like-shaped layer of capacitor anode material 114, suitably bonded to one side of current collector foil 116. Current collector foil 116 is suitably formed of copper having a thickness in the range of five to twenty-five micrometers. An example of suitable capacitor anode material is a mixture of activated carbon particles (gray dotted particles) with a smaller proportion of solid electrolyte particles (white particles with dark dots). Capacitor anode material layer 114 is a part of anode electrode 112. Anode electrode 112 comprises capacitor anode material layer 114 bonded to the left side of current collector foil 116 and a like-layer 114' of capacitor anode material bonded to the right side of current collector foil 116.

A layer of solid electrolyte material 110' (light particles with black dots) is assembled with one of its rectangular surfaces lying against the outer surface of capacitor anode material layer 114'. Placed against the right-side surface of solid electrolyte material 110' is a layer of particulate lithium-ion battery cathode material 122, which is part of cathode electrode 118. Cathode electrode 118 also comprises an aluminum current collector 120 with a second layer of lithium-ion battery cathode electrode material 122' bonded to its opposing major surface. The compositions of lithium-ion battery cathode material layers 122, 122' are like, and are schematically illustrated like the cathode materials of cathode electrode 104.

Solid electrolyte layer 110" is placed against the surface of cathode material layer 122'. And a layer of anode material 126 bonded to copper current collector 128 is placed against the right-side surface of solid electrolyte layer 110". The anode material 126 is a mixture of particles of lithium-ion battery material (white with an organized pattern of black dots) and particles of solid electrolyte (white with random black dots).

The assembly of the capacitor-assisted solid-state battery 100 embodiment of FIG. 1 is completed with the electrical connections 130, 132 between the cathodes 101, 118, which are positively-charged during discharge of the capacitor-assisted battery 100, and with electrical connections 134, 136 between the capacitor anode 112 and the battery anode 124 which are negatively charged during discharge of the capacitor-assisted battery.

In the schematic illustration of FIG. 1, the respective electrodes are enlarged for purposes of illustration of the mixed electrode materials and their positioning in the assembled three-cell, capacitor-assisted battery. In an application for such a capacitor-assisted battery, the electrodes would be sized and shaped to provide a specified combination of energy requirement and power requirement in the capacitor assisted battery. In many assembled electrochemical cells, such basic cell units may be repeated as a hybrid cell unit and/or combined with additional battery cell units in order to achieve a desired combination of battery properties and capacitor properties.

In the embodiment of FIG. 1, a two-sided anode 112 of capacitor material was used in combination with a battery anode 124. The cathode members 101, 118 of the assembly were mainly formed of active cathode material for a lithium-ion battery. In a reverse embodiment of the FIG. 1 assembly, capacitor materials could be selected for use in a two-sided capacitor cathode which would be electrically connected with a battery material cathode and used in electrically-opposed combination with lithium-ion battery material anodes.

Unless otherwise stated, the schematic illustrations of lithium-ion anode particles and cathode particles and capacitor electrode particles are the same in the following figures as they were illustrated in FIG. 1.

In the embodiment of FIG. 2, an electric double-layer capacitor (EDLC) is incorporated into the capacitor-assisted, solid-state battery assembly 200.

Capacitor cathode 201 is formed of a suitable current collector foil 202 carrying a uniform layer 204 of a mixture of capacitor cathode particles and solid electrolyte particles. Solid electrolyte layer 210 separates capacitor cathode 201 from capacitor anode electrode 212. Capacitor anode 212 is formed of current collector foil 216 carrying layers of capacitor anode material 214, 214' bonded to opposite major faces of the current collector 216. Each layer of capacitor anode material 214, 214' is formed of a mixture of capacitor anode particles (e.g., activated carbon particles) and particles of solid electrolyte. Lying against capacitor anode material layer 214' of the capacitor anode 212 is solid electrolyte layer 210'. The balance of the three-cell capacitor-assisted solid-state battery assembly is like the assembly illustrated in FIG. 1.

Solid electrolyte layer 210' separates capacitor anode 212 from battery cathode 218. Battery cathode 218 is formed of copper current collector foil 220 carrying opposing layers of cathode material 222, 222'. Each layer of cathode material 222, 222' is mainly formed of a mixture of particles of a suitable active lithium-ion battery cathode material and solid electrolyte particles. Solid electrolyte layer 210" separates battery cathode 218 from lithium-ion battery anode 224. Battery anode 224 is formed of a copper current collector foil 228 carrying a layer of anode material 226 bonded to the left side (or both sides) of current collector foil 228. The layer of anode material 226 is mainly formed of a mixture of particles of a suitable lithium-ion battery anode material (for example, $Li_4Ti_5O_{12}$) mixed with solid electrolyte particles.

The assembly of the capacitor-assisted solid-state battery 200 embodiment of FIG. 2 is completed with the electrical connections 230, 232 between the cathodes 201, 218, which are positively-charged during discharge of the capacitor-assisted battery 200, and with electrical connections 234, 236 between the capacitor anode 212 and the battery anode 224 which are negatively charged during discharge of the capacitor-assisted battery.

The incorporation of the electric double-layer capacitor members into the battery cells may be utilized to significantly increase the power performance of the capacitor-assisted, solid-state battery assembly.

FIG. 3 illustrates a capacitor-assisted, solid-state battery embodiment 300 which utilizes an asymmetric electrode 312 formed of a layer of lithium-ion battery anode material fixed on one side of a current collector and a layer of capacitor anode material on the other side of the current collector. This asymmetric anode electrode embodiment is illustrated in FIG. 3. Alternatively, an analogous asymmetric cathode electrode may be used.

Cathode electrode 301 is formed of a layer of battery cathode material 304 attached to aluminum current collector foil 302. Battery cathode material 304 is mainly formed of a mixture of particles of lithium-ion battery cathode active material with a suitable proportion of solid electrolyte particles. Placed against the cathode layer material 304 is a layer of solid electrolyte particles 310. Asymmetric anode electrode 312 is positioned against solid electrolyte layer 310. Asymmetric anode electrode 312 is formed of a copper foil current collector 316 carrying a layer of battery anode material particles 314 on its left face and a layer of capacitor anode materials 315 on its right face. The layer of battery anode material particles 314 comprises a particulate mixture of suitable lithium-ion battery anode active particles mixed with a suitable portion of solid electrolyte material. The layer of capacitor anode material 315 comprised a mixture of suitable capacitor anode material (e.g., activated carbon particles) and solid electrolyte particles. The rest of the three-cell, capacitor-assisted, solid state battery assembly is the same as illustrated in FIG. 1.

Solid electrolyte layer 310' separates asymmetric capacitor/battery anode 312 from battery cathode 318. Battery cathode 318 is formed of copper current collector foil 320 carrying opposing layers of cathode material 322, 322'. Each layer of cathode material 322, 322' is mainly formed of a mixture of particles of a suitable lithium-ion battery cathode active material and solid electrolyte particles. Solid electrolyte layer 310" separates battery cathode 318 from a battery anode 324. Battery anode 324 is formed of a copper current collector foil 328 carrying a layer of anode material 326 bonded to the left side (or both sides) of current collector foil 328. The layer of anode material 326 is mainly formed of a mixture of particles of a suitable lithium-ion battery anode material (for example, $Li_4Ti_5O_{12}$) mixed with a proportion of solid electrolyte particles.

The assembly of the capacitor-assisted solid-state battery 300 embodiment of FIG. 3 is completed with the electrical connections 330, 332 between the cathodes 301, 318, which are positively-charged during discharge of the capacitor-assisted battery 300 and with electrical connections 334, 336 between the capacitor/battery anode 312 and the battery anode 324 which are negatively charged during discharge of the capacitor-assisted battery.

FIG. 4 illustrates a capacitor-assisted solid-state battery 400 that employs a first solid electrolyte composition composed for service in contact with both a capacitor electrode composition and an opposing lithium-ion battery anode composition or a lithium-ion battery cathode composition. A different solid electrolyte composition is used for placement between an opposing battery anode and a battery cathode.

In an illustrative example, cathode 401 comprises a layer of lithium-ion battery cathode active material 404 attached to aluminum current collector foil 402. For example, the lithium-ion cathode material 404 is formed of a mixture of particles of $LiNbO_3$-coated $LiCoO_2$ (black particles with random white dots) with a specialized solid electrolyte, specifically polyethylene oxide/$LiClO_4$ solid polymer (white background with upwardly-extending diagonal lines). A second example of a specialized electrolyte for capacitor electrode material is a gel electrolyte composed of poly (vinylidene difluoride-co-hexafluoropropylene) polymer after soaking in $LiPF_6$ electrolyte.

This specialized solid polymer electrolyte material works effectively mixed with the lithium-ion battery cathode particles (in cathode layer 404 bonded to current collector 402) and, for example, activated carbon anode particles used in capacitor anode layer 414 bonded to current collector 406. Placed against the cathode layer material 404 is the polyethylene oxide/$LiClO_4$ solid polymer specialized electrolyte layer 410.

Placed against solid-state electrolyte layer 410 is a capacitor anode 412 formed of like-shaped and composed layers 414, 414' of capacitor anode material particles (such as activated carbon particles) mixed/contacted with the polyethylene oxide/$LiClO_4$ solid polymer electrolyte material on opposing major surfaces of current collector foil 416. A second solid-state electrolyte layer 410', like solid state electrolyte layer 410 is assembled against capacitor anode material layer 414'.

Lithium-battery cathode 418 is placed coextensively against the right-side surface of the polyethylene oxide/$LiClO_4$ solid polymer electrolyte layer 410'. Cathode 418 is formed of two layers of a mixture of active battery cathode material particles (e.g., $LiNbO_3$-coated $LiCoO_2$) with differing compositions of solid electrolyte particles 422, 422' attached to opposing sides of current collector foil 420. Cathode layer 422 is formed of lithium-ion battery cathode material particles mixed/contacted with the polyethylene oxide/$LiClO_4$ solid polymer electrolyte. Cathode layer 422' is formed of lithium-ion battery cathode material particles mixed with particles of, for example, 75 mole % $Li_2S$-25 mole % $P_2S_5$.

A suitable solid-state electrolyte layer 410" for lithium battery electrodes is placed against the surface of cathode material layer 422'. Anode electrode 424 is placed against the right side of solid-state electrolyte layer 410". Anode electrode 424 is formed of a layer of a particulate mixture 426 of active lithium-ion anode material (e.g., $Li_4Ti_5O_{12}$) and particles of a solid electrolyte compatible with the anode material particles (e.g., 75 molar % $Li_2S$-25 molar % $P_2S_5$) attached to the left side of copper current collector foil 428.

The assembly of the capacitor-assisted solid-state battery 400 embodiment of FIG. 4 is completed with the electrical connections 430, 432 between the cathodes 401, 418, which are positively-charged during discharge of the capacitor-assisted battery 400 and with electrical connections 434, 436 between the capacitor anode 412 and the battery anode 424 which are negatively charged during discharge of the capacitor-assisted battery 400.

FIG. 5 illustrates a capacitor-assisted solid-state battery 500 in which either each anode or each cathode (or both anode and cathode) is formed (largely) of a mixture of capacitor material particles, lithium-ion battery electrode material particles, and solid electrolyte particles. In the embodiment illustrated in FIG. 5, capacitor anode material particles are mixed with lithium-ion battery anode material particles, and solid electrolyte material particles. The embodiment illustrated in FIG. 5 uses solid electrolyte particles.

Cathode electrode 501 is formed of a layer of battery cathode material 504 attached to aluminum current collector foil 502. Battery cathode material 504 is formed substantially of a mixture of particles of lithium-ion battery cathode active material (dark particles with white spots) with a suitable proportion of solid electrolyte particles (white particles with black spots). Placed against the cathode layer material 504 is a layer of solid electrolyte particles 510 (white particles with black spots).

Mixed anode/capacitor electrode 512 is positioned against solid electrolyte layer 510. Anode electrode 512 is formed of a copper foil current collector 516 carrying a layer of mixed battery anode and capacitor anode material particles, with solid electrolyte particles, 514 on its left face and a like layer of battery anode/capacitor anode materials/solid electrolyte particles 514' on its right face. Each layer of anode material particles 514, 514' comprises a particulate mixture of suitable lithium-ion battery anode active material (white particles with rows and columns of black dots), suitable capacitor material (black dotted particles), and a suitable portion of solid electrolyte material (white particles with black dots). The proportions of battery and capacitor anode particles is determined by the required properties of the electrode.

Solid electrolyte layer 510' separates mixed battery/capacitor anode 512 from lithium-ion battery cathode 518. Battery cathode 518 is formed of copper current collector foil 520 carrying opposing layers of cathode material 522, 522'. Each layer of cathode material 522, 522' is formed substantially of a mixture of particles of a suitable lithium-ion battery cathode active material (black particles with white dots) and solid electrolyte particles (white particles with black dots). Solid electrolyte layer 510" separates battery cathode 518 from a battery/capacitor anode 524. Mixed battery/capacitor anode 524 is formed of a copper current collector foil 528 carrying a layer of battery/capacitor mixed material 526 bonded to the left side (or both sides) of current collector foil 528. The layer of anode material 526 is formed of a mixture of particles of a suitable lithium-ion battery anode material (for example, $Li_4Ti_5O_{12}$, white particles with organized black dots) mixed capacitor particles (e.g., activated carbon particles, (gray particles), and further, with a suitable proportion of solid electrolyte particles (white particles with black dots).

The assembly of the capacitor-assisted solid-state battery 500 embodiment of FIG. 5 is completed with the electrical connections 530, 532 between the cathodes 501, 518, which are positively-charged during discharge of the capacitor-assisted battery 500 and with electrical connections 534, 536 between the capacitor anode 512 and the battery anode 524 which are negatively charged during discharge of the capacitor-assisted battery.

Following are examples of compositions that may be suitably adapted for use, in particulate or powder form, as solid electrolyte materials in embodiments of capacitor-assisted solid-state batteries as disclosed in this specification.

(a) Sulfide-based SE. e.g., $Li_2S$—$P_2S_5$, $Li_2S$—$P_2S_5$-$MS_x$, LGPS ($Li_{10}GeP_2S_{12}$), thio-LISICON ($Li_{3.25}Ge_{0.25}P_{0.75}S_4$), $Li_{3.4}Si_{0.4}P_{0.6}S_4$, $Li_{10}GeP_2S_{11.7}O_{0.3}$, lithium argyrodite $Li_6PS_5X$ (X=Cl, Br, or I), $Li_{9.54}Si_{1.74}P_{1.44}S_{11.7}Cl_{0.3}$ (25 mS/cm), $Li_{9.6}P_3S_{12}$, $Li_7P_3S_{11}$, $Li_9P_3S_9O_3$, $Li_{10.35}Ge_{1.35}P_{1.65}S_{12}$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, and $Li_{10}(Si_{0.5}Sn_{0.5})P_2S_{12}$.

(c) Oxide-based SE. e.g., perovskite type ($Li_{3x}La_{2/3-x}TiO_3$), NASICON type ($LiTi_2(PO_4)_3$), $Li_{1+x}Al_xTi_{2-x}(PO_4)_3$ (LATP), $Li_{1+x}Al_xGe_{2-x}(PO_4)_3$ (LAGP), $Li_{1+x}Y_xZr_{2-x}(PO_4)_3$ (LYZP), LISICON type ($Li_{14}Zn(GeO_4)_4$), and Garnet type ($Li_{6.5}La_3Zr_{1.75}Te_{0.25}O_{12}$ and $L_7La_3Zr_2O_{12}$). Polymer-based SE: the polymer host together with a lithium salt act as a solid solvent. Polymer: polyethylene oxide (PEO), polypropylene oxide (PPO), polyethylene glycol (PEG), polymethyl methacrylate (PMMA), polyacrylonitrile (PAN), polyvinylidene fluoride (PVDF), poly(vinylidene-fluoride-hexafluoropropylene ((PVDF-HFP), and poly (vinyl chloride) PVC.

(d) Nitride-based SE. e.g. $Li_3N$, $Li_7PN_4$, and $LiSi_2N_3$.
(e) Hydride-based SE. e.g. $LiBH_4$, $LiBH_4$—LiX (X=Cl, Br or I), $LiNH_2$, $Li_2NH$, $LiBH_4$—$LiNH_2$, and $Li_3AlH_6$.
(e) Halide-based SE. e.g. LiI, $Li_2CdCl_4$, $Li_2MgCl_4$, $Li_2CdI_4$, $Li_2ZnI_4$, and $Li_3OCl$.
(f) Borate-based SE. e.g. $Li_2B_4O_7$, and $Li_2O$—$B_2O_3$—$P_2O_5$.
(g) Thin-film SE. e.g., LiPON ($Li_{2.88}PO_{3.73}N_{0.14}$).
(h) Hybrid SE, e.g., inorganic solid electrolyte $Li_{1.5}Al_{0.5}Ge_{1.5}(PO_4)_3$+polymer electrolyte (PEO+LiClO_4).

Other specialized solid-state electrolytes for capacitor comprise: polyvinyl alcohol (PVA)-$H_2SO_4$; PVA-$H_3PO_4$; LiCl/PVA; PVA-KOH; PVdF—HFP/[EMIM][$Tf_2N$]/zeolite.

This invention has been illustrated with some examples which are not intended to be limiting of the scope of the invention.

The invention claimed is:

1. A capacitor-assisted, solid-state lithium-ion battery comprising:
   a capacitor electrode;
   a battery anode electrode;
   a battery cathode electrode;
   at least three layers of solid electrolyte particles; and
   four like-shaped, mutually parallel current collector foils with two outer-positioned current collector foils located outside of and sandwiching therebetween two inner-positioned current collector foils, each of the current collector foils having two opposing surfaces,
   wherein the two inner-positioned current collector foils each carries a first layer of particles of electrode material bonded to each of the opposing surfaces, and the two outer-positioned current collector foils each carries a second layer of particles of electrode material bonded to at least inward-facing ones of the opposing surfaces,
   wherein each of the first layers of particles of electrode material faces another one of the first layers of particles of electrode material or one of the second layers of particles of electrode material in a paired arrangement;
   wherein each of the first and second layers of particles of electrode material abuts a coextensive surface area of one of the layers of solid electrolyte particles,
   wherein a first pair of the current collector foils is electrically connected to serve as the battery cathode electrode during discharge of the capacitor-assisted, solid-state lithium-ion battery, and a second pair of the current collector foils is electrically connected to serve as the battery anode electrode during discharge of the capacitor-assisted, lithium-ion battery; and
   wherein at least one layer of the first and second layers of particles of electrode material includes a layer of capacitor anode material particles mixed with solid electrolyte particles and/or a layer of capacitor cathode material particles mixed with solid electrolyte particles thereby forming the capacitor electrode.

2. The capacitor-assisted, solid-state lithium-ion battery of claim 1, in which the layer of capacitor anode material particles is mixed with lithium-ion battery anode material particles.

3. The capacitor-assisted, solid-state lithium-ion battery of claim 1, in which the layer of capacitor cathode material particles is mixed with lithium-ion battery cathode material particles.

4. The capacitor-assisted, solid-state lithium-ion battery of claim 1, in which the layer of capacitor anode material particles includes activated carbon particles mixed with the solid electrolyte particles.

5. The capacitor-assisted, solid-state lithium-ion battery of claim 1, in which the layer of capacitor cathode material particles includes conductive carbon particles mixed with the solid electrolyte.

6. The capacitor-assisted, solid-state lithium-ion battery of claim 1, in which the capacitor electrode includes a capacitor anode comprising the layer of capacitor anode material particles mixed with the solid electrolyte particles bonded to the two opposing surfaces of one of the inner-positioned current collector foils.

7. The capacitor-assisted, solid-state lithium-ion battery of claim 1, in which the capacitor electrode includes a capacitor cathode comprising the layer of capacitor cathode material particles mixed with the solid electrolyte particles bonded to the two opposing surfaces of one of the inner-positioned current collector foils.

8. The capacitor-assisted, solid-state lithium-ion battery of claim 1, in which the battery anode electrode includes an asymmetric anode electrode formed of the first layer of particles including lithium-ion battery anode materials mixed with particles of an electrolyte and bonded to one side of one of the current collector foils.

9. The capacitor-assisted, solid-state lithium-ion battery of claim 1, in which the battery cathode electrode includes an asymmetric cathode electrode formed of the first layer of particles including lithium-ion battery cathode materials mixed with particles of an electrolyte and bonded to one side of one of the current collector foils.

10. The capacitor-assisted, solid-state lithium-ion battery of claim 1, in which the at least three layers of solid electrolyte particles each includes a solid lithium-based electrolyte material mixed with a polymeric binder.

11. The capacitor-assisted, solid-state lithium-ion battery of claim 1, in which at least one layer of the first and second layers of particles of electrode material is a mixture comprising particles of capacitor anode material, particles of lithium-ion battery anode material, and particles of a solid electrolyte.

12. The capacitor-assisted, solid-state lithium-ion battery of claim 1, in which at least one layer of the first and second layers of particles of electrode material is a mixture comprising particles of capacitor cathode material, particles of lithium-ion battery cathode material, and particles of a solid electrolyte.

13. The capacitor-assisted, solid-state lithium-ion battery of claim 1, in which the capacitor electrode includes: (i) a capacitor anode electrode formed of opposing layers of the layer of capacitor anode material particles mixed with the solid electrolyte particles that faces the battery cathode electrode formed of particles of lithium-ion battery cathode material mixed with particles of a first solid electrolyte composition, and (ii) a capacitor cathode electrode formed of the layer of capacitor cathode material particles mixed with the solid electrolyte particles that faces an anode layer of lithium-ion battery anode particles mixed with particles of a second solid electrolyte composition.

14. The capacitor-assisted, solid-state lithium-ion battery of claim 13, in which the particles of the first solid electrolyte composition include polyethylene oxide/LiClO$_4$ solid polymer electrolyte material, and the particles of the second solid electrolyte composition include about 75 molar percent Li$_2$S and about 25 molar percent P$_2$S$_5$.

15. The capacitor-assisted, solid-state lithium-ion battery of claim 1, in which the capacitor electrode includes a capacitor cathode electrode formed of opposing layers of the layer of capacitor cathode material particles mixed with the solid electrolyte particles that faces the battery anode electrode formed of particles of lithium-ion battery anode material mixed with particles of a first solid electrolyte composition, and wherein an anode layer of lithium-ion battery anode particles mixed with particles of a second solid electrolyte composition faces a cathode layer of lithium-ion battery cathode particles mixed with particles of the second solid electrolyte composition.

16. The capacitor-assisted, solid-state lithium-ion battery of claim 15, in which the particles of the first solid electrolyte composition include polyethylene oxide/LiClO$_4$ solid polymer electrolyte material, and the particles of the second solid electrolyte composition include about 75 molar percent Li$_2$S and about 25 molar percent P$_2$S$_5$.

17. The capacitor-assisted, solid-state lithium-ion battery of claim 1, in which the layers of electrolyte particles include an electrolyte material composed of a mixture of about 75 molar percent Li$_2$S and about 25 molar percent P$_2$S$_5$.

18. The capacitor-assisted, solid-state lithium-ion battery of claim 1, wherein the solid electrolyte particles that form the capacitor electrode comprise: polyvinyl alcohol (PVA)-H$_2$SO$_4$, PVA-H$_3$PO$_4$, LiCl/PVA PVA-KOH, or PVdF-HFP/[EMIM][Tf$_2$N]/zeolite.

19. The capacitor-assisted, solid-state lithium-ion battery of claim 1, wherein the first or second layers of particles of electrode material borne by the first pair of the current collector foils serving as the battery cathode electrode include a cathode active material comprising LiFePO$_4$, LiMn$_2$O$_4$, LiCoO$_2$, LiNi$_{0.5}$Mn$_{1.5}$O$_4$, a lithium nickel cobalt manganese oxide (NCM) material, a lithium nickel cobalt aluminum oxide (NCA) material, or LiNbO$_3$-coated LiCo$_2$.

20. The capacitor-assisted, solid-state lithium-ion battery of claim 1, wherein the first or second layers of particles of electrode material borne by the first pair of the current collector foils serving as the battery cathode electrode include LiNbO$_3$-coated LiCoO$_2$ mixed with a solid electrolyte material formed of a Li$_2$S and P$_2$S$_5$.

21. The capacitor-assisted, solid-state lithium-ion battery of claim 1, wherein the first or second layers of particles of electrode material borne by the second pair of the current collector foils serving as the battery anode electrode include an anode active material comprising a silicon material, a silicon-carbon blended material, Li$_4$Ti$_5$O$_{12}$, a transition-metal, a metal oxide/sulfide, a Li metal, or a Li-metal alloy.

22. The capacitor-assisted, solid-state lithium-ion battery of claim 1, wherein the first or second layers of particles of electrode material borne by the second pair of the current collector foils serving as the battery anode electrode include Li$_4$Ti$_5$O$_{12}$ mixed with a solid electrolyte material formed of a Li$_2$S and P$_2$S$_5$.

23. The capacitor-assisted, solid-state lithium-ion battery of claim 1, wherein the at least three layers of solid electrolyte particles each includes Li$_3$N, Li$_7$PN$_4$, and/or LiSi$_2$N$_3$.

24. The capacitor-assisted, solid-state lithium-ion battery of claim 1, wherein the at least three layers of solid electrolyte particles each includes LiBH$_4$, LiBH$_4$-LiX (X=Cl, Br or I), LiNH$_2$, Li$_2$NH, LiBH$_4$-LiNH$_2$, and/or Li$_3$AlH$_6$.

25. A battery assembly comprising:
at least three layers of solid electrolyte particles; and
at least four current collector foils including two outer-positioned current collector foils sandwiching therebetween two inner-positioned current collector foils, each of the current collector foils having two opposing surfaces, the two inner-positioned current collector foils each having a first layer of electrode material particles bonded to each of the opposing surfaces, and the two outer-positioned current collector foils each having a second layer of electrode material particles bonded to at least one of the opposing surfaces,
wherein the first layers of electrode material particles each faces another one of the first layers of electrode material particles or one of the second layers of electrode material particles;
wherein the first and second layers of electrode material particles each abuts a coextensive surface area of one of the at least three layers of solid electrolyte particles,
wherein a first pair of the current collector foils is electrically connected to serve as a battery cathode electrode during discharge of the battery, and a second pair of the current collector foils is electrically connected to serve as a battery anode electrode during discharge of the battery; and wherein at least one layer of the first and second layers of electrode material particles includes capacitor anode material particles mixed with solid electrolyte particles and/or capacitor cathode material particles mixed with solid electrolyte particles thereby forming a capacitor electrode.

\* \* \* \* \*